US011676046B2

(12) United States Patent
Kawas et al.

(10) Patent No.: US 11,676,046 B2
(45) Date of Patent: Jun. 13, 2023

(54) MICROCONTROLLER FOR TRIGGERING PRIORITIZED ALERTS AND PROVISIONED ACTIONS

(71) Applicant: International Business Machines Corporation, Armonk, NY (US)

(72) Inventors: Ban Kawas, Palo Alto, CA (US); Dharmashankar Subramanian, White Plains, NY (US); Josephine Schweiloch, Larchmont, NY (US); Paul Price, Pound Ridge, NY (US); Bonnie Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 15/855,500

(22) Filed: Dec. 27, 2017

(65) Prior Publication Data

US 2019/0197367 A1 Jun. 27, 2019

(51) Int. Cl.
*G06N 5/04* (2023.01)
*G06N 5/02* (2023.01)
*G06F 16/21* (2019.01)
*G06F 16/2457* (2019.01)
*G06F 18/20* (2023.01)

(52) U.S. Cl.
CPC ............. *G06N 5/04* (2013.01); *G06F 16/219* (2019.01); *G06F 16/24578* (2019.01); *G06F 18/29* (2023.01); *G06N 5/02* (2013.01)

(58) Field of Classification Search
CPC ......... G06K 9/9269; G06N 5/02; G06F 18/29
See application file for complete search history.

(56) References Cited

U.S. PATENT DOCUMENTS

| 8,364,519 | B1* | 1/2013 | Basu ................ G06Q 10/06393 |
| | | | 705/7.38 |
| 8,849,734 | B2 | 9/2014 | Fredericksen et al. |
| 9,258,321 | B2 | 2/2016 | Amsler et al. |
| 9,282,114 | B1 | 3/2016 | Dotan et al. |
| 9,672,085 | B2* | 6/2017 | Zhu .................... G06Q 10/0639 |
| 2013/0297095 | A1 | 11/2013 | Kwak |
| 2014/0149162 | A1 | 5/2014 | Ribeiro et al. |
| 2015/0269490 | A1 | 9/2015 | Stillinger et al. |

(Continued)

OTHER PUBLICATIONS

Ma, Zhanyu. "Bayesian estimation of the Dirichlet distribution with expectation propagation." 2012 Proceedings of the 20th European Signal Processing Conference (EUSIPCO). IEEE, 2012. (Year: 2012).*

*Primary Examiner* — Kevin W Figueroa
(74) *Attorney, Agent, or Firm* — Scully, Scott, Murphy & Presser, P.C.; Daniel P. Morris

(57) ABSTRACT

Triggering a prioritized alert and provisioning an action may include receiving historical data associated with a set of projects, the historical data spanning multiple consecutive time periods. A hierarchical data structure is generated that includes occurrences of performance factors in the historical data. Based on the hierarchical data structure, Bayesian scores associated with the performance factors are derived, the Bayesian scores representing likelihood of the performance factors occurring in a given project. The performance factors are ranked based on the Bayesian scores. Based on ranking, an alert and an action may be automatically triggered.

20 Claims, 6 Drawing Sheets

(56) References Cited

U.S. PATENT DOCUMENTS

| | | | |
|---|---|---|---|
| 2015/0339604 A1* | 11/2015 | Alikhan | G06Q 10/0635 |
| | | | 705/7.28 |
| 2016/0203269 A1 | 7/2016 | Breitenstein et al. | |
| 2016/0248796 A1 | 8/2016 | Choi et al. | |
| 2016/0267408 A1 | 9/2016 | Singh et al. | |
| 2016/0342907 A1 | 11/2016 | Flinn et al. | |
| 2017/0006135 A1 | 1/2017 | Siebel et al. | |
| 2018/0268339 A1* | 9/2018 | Malchev | G06F 30/20 |

* cited by examiner

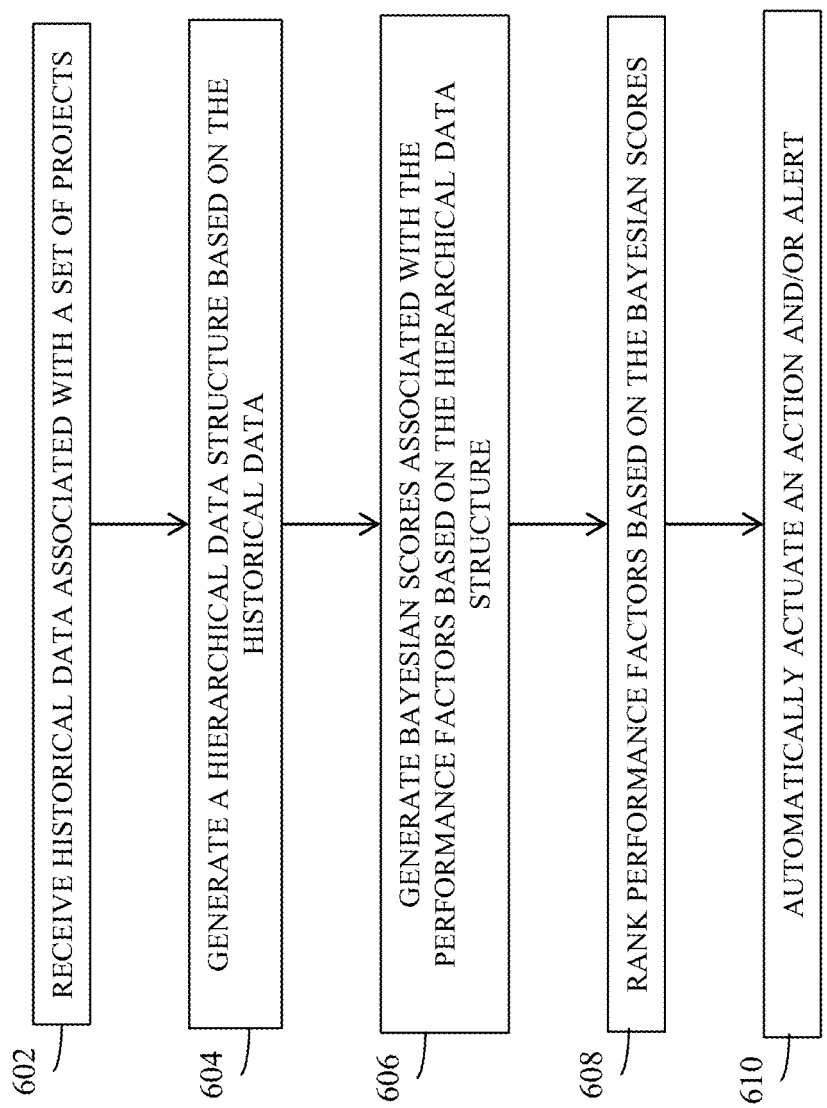

MICROCONTROLLER FOR TRIGGERING PRIORITIZED ALERTS AND PROVISIONED ACTIONS

FIELD

The present application relates generally to computers and computer applications, and more particularly to autonomous triggering of prioritized alerts and provisioning actions.

BACKGROUND

Current state of the art in risk management relies on manual and subjective evaluations that are usually non-data-driven and are heavily based on experts' opinions. In a fast paced environment in which the generative process changes dynamically, it is prohibitive to manage risks manually without relying on a machine to process large-scale dynamic data that can uncover patterns which a human (even experts) may not be able to observe. For example, new risks may arise or known risks may become more severe in an ever-changing environment. There is a need to surface risks in a timely fashion in order to address them and manage them appropriately, and in a manner that improves the functioning of a machine in efficiently uncovering patterns.

BRIEF SUMMARY

A system and method of triggering a prioritized alert and automatically provisioning an action may be provided. The system, in one aspect, may include a hardware processor operable to receive historical data associated with a set of projects, the historical data spanning multiple consecutive time periods. The hardware process may be further operable to generate a hierarchical data structure comprising occurrences of performance factors in the historical data. Based on the hierarchical data structure, the hardware processor may be further operable to derive Bayesian scores associated with the performance factors, the Bayesian scores representing likelihood of the performance factors occurring in a given project. The hardware processor may be further operable to rank the performance factors based on the Bayesian scores. Based on the ranking, the hardware processor may be further operable to automatically trigger an alert and an action.

A method of triggering a prioritized alert and provisioning an automatic action, in one aspect, may include receiving historical data associated with a set of projects, the historical data spanning multiple consecutive time periods. The method may also include generating a hierarchical data structure comprising occurrences of performance factors in the historical data. The method may further include, based on the hierarchical data structure, deriving Bayesian scores associated with the performance factors, the Bayesian scores representing likelihood of the performance factors occurring in a given project. The method may also include ranking the performance factors based on the Bayesian scores. The method may also include, based on the ranking, automatically triggering an alert and an action.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 is a flow diagram illustrating a method in one embodiment.

DETAILED DESCRIPTION

Figure 1:
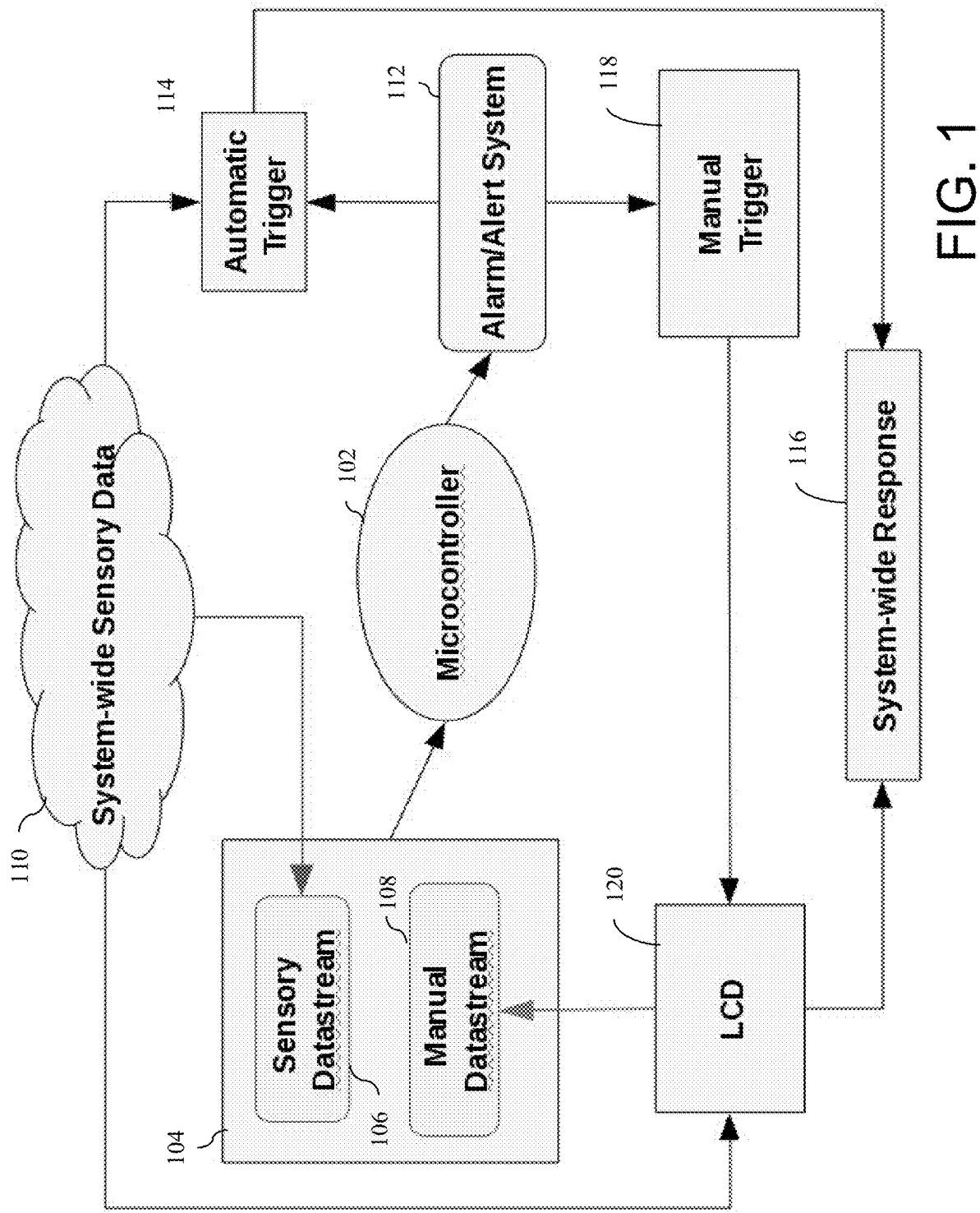
FIG. 1 is a diagram illustrating components of a system in one embodiment.

System, method and techniques for a microcontroller are disclosed, which may identify and prioritize dynamically changing features in a given generative process monitored through sensory large-scale data and experts' opinions. The system, method and/or techniques, in one aspect, may process large-scale data, uncover patterns in a timely fashion, and trigger alerts and actions, for instance, in a fast-paced changing computing environment. The microcontroller actuating action based on its processing forms a control system.

In some embodiment, the system, method and/or techniques include a data collection process and gathering of experts' opinions in the form of decision-rules that are input to the microcontroller. In one aspect, the microcontroller generates time-sensitive alerts and actions based on the combination of sensory-data and experts' opinions, thereby efficiently and robustly managing and/or controlling a generative process of interest. The microcontroller in some embodiment collect, process, and aggregate sensory-data in a manner that enables the automatic pattern extraction, that otherwise would be prohibitive, for instance, especially when sufficient history is not available. In some embodiments, the microcontroller may address limited availability of data for newly observed patterns and data uncertainty via Bayesian modeling and by utilizing hierarchical structure of data. The Bayesian modeling also enables the cross-comparison between risks that do not have equal amounts of data. The utilization of data's hierarchical structure in Bayesian prior-setting allows for a data-driven robust approach.

In some embodiment, the microcontroller as a control system may process large-scale high-dimensional sensory data and automatically learn dynamical critical features governing the generative process of interest, approximate and update the generative process of interest, generate prioritized alerts and/or risks based on pre-set criteria such as resource planning, and trigger an action that handles at least some of the alerts and manage associated risks.

The system and/or method may provide for the connection between 5-star product rating systems and the ranking of risks/opportunities based on their occurrence histograms. For instance, the system and/or method may provide a mapping of one problem (e.g., ranking of risks and/or opportunities in multi-period projects and/or initiatives) onto another (e.g., product reviews from users for products and 5-star ratings as the format of reviews). In some embodiment, the system and/or method may take a "temporal persistence" view, e.g., by focusing on the stickiness of recurrence of risks and/or opportunities over time (across time periods). More specifically, in some embodiments, the mapping that the system and/or method formulate maps: Risks:=Products/Items, Projects:=Users/Voter/Customers (e.g., each voter's vote is a specific input (e.g., 1-star, or 2-star, . . . ) for a corresponding item/product from the voter/user); Occurrences/Number of repeated occurrences (once, twice, thrice, . . . ):=A ratings scale (like 1-star, 2-star, 3-star, . . . ). In this view, the frequency distribution of the number of recurrent observations of any chosen risk/opportunity across projects is instead interpreted as the frequency distribution of the number of "stars" across people/users/voters for the said risk/opportunity (now instead thought of, as a product/item). Doing so allows the system and/or method to use mathematical models of aggregating such 5-star (in general N-star ratings from users) to address the problem of computing a score for the temporal persistence of the risk (e.g., similar to: a score of net rating for a given product).

In one aspect, a robust analytical method may prioritize and rank risks/opportunities experienced by a single project or a portfolio of projects. The system and/or method may also strengthen the signal through hierarchy. For instance, since products or items may be organized in a hierarchy (such as various types of running shoes from a given manufacturer), and similarly risks/opportunities may be organized hierarchically in a taxonomy of finer and finer descriptions of risks/opportunities, the system and/or method in some embodiments may use such a hierarchy to strengthen the signal of available observations. Observations refer to various ratings on a rating-scale for a given product across users, e.g., mapped from the various number of recurrent occurrences of the risk across projects per the mapping. Hierarchical signal boosting refers to pooling or combining observations of different levels in a hierarchy, for example, to have more observations at a higher level. For instance, if there are only a few observations (e.g., a threshold number) lower in the hierarchy, the system and/or method in some embodiments may pool, e.g., union these observations by going one (or more) level(s) up the hierarchy. Doing so provides more observations at the higher level, and this is referred to as hierarchical signal boosting.

The system and/or method in one aspect may prioritize decisions in a generative process of interest. The generative process of interest, for example, may include a portfolio of business initiatives, for example, in which each initiative in the portfolio or set spans multiple consecutive time-periods. The set may include key or selected negative and positive performance-factors for each initiative in each time period, for example, recorded on a structured taxonomy of negative and positive performance-factors. The structured taxonomy may be a hierarchical taxonomy. In one aspect, a score of the temporal persistence of any chosen performance-factor is modeled and computed, which is specific to any chosen initiative of interest. The score of persistence is related to the recurrence of the chosen performance-factor in the future, conditional on having witnessed the performance-factor at least once in the time-indexed history (to-date) of the chosen initiative. Otherwise a data-drive default score is computed. A score of the co-emergence of any chosen performance-factor, specific to any chosen initiative of interest may be determined. The score of co-emergence is related to the potential emergence of the chosen performance-factor in the future, conditional on not having witnessed it in the time-indexed history to-date of the chosen initiative, and conditional on the actual set of performance-factors that have been witnessed in the time-indexed history (to-date) of the chosen initiative. In some embodiments, dynamic rank ordered lists of one or more performance-factors are provided based on persistence scores and co-emergence scores, for example, in the form of a report, specific to any chosen initiative of interest and time period. In some embodiments, lists are ranked by decreasing score of persistence, specific to the chosen initiative of interest.

In some embodiments, there may be two scores: 1) temporal persistence (e.g., using a Bayesian model described below); and 2) co-emergence score. Co-emergence score is a score that captures how likely is any risk, e.g., "r" to co-occur/emerge later in time, having observed any actual set of risks, e.g., "R", observed to date. It is a count based conditional probability. The system and/or method in some embodiments look at all projects that have witnessed the given actual set of risks ("R") by some point in time in their respective timeline, and compute the fraction of those projects that also experienced the risk ("r") at any later point in time. Co-emergence score is computed as a conditional probability using sample observations.

In some embodiments, a set of mitigation actions are recommended and triggered for each performance-factor (risk) in the (ranked) list of persistent performance-factors (risks), which are ranked by their persistence scores.

In some embodiments, a set of mitigation actions, or preventive actions, are recommended and triggered for each performance-factor (risk) in the (ranked) list of co-emergent performance-factors (risks), which are ranked by their co-emergence scores.

In some embodiments, a set of best practices is automatically assembled for each performance-factor (risk) in the (ranked) list of persistent performance-factors (risks), using historical data on initiatives that experienced persistence (i.e., recurrence over time) for the performance-factor (risk) under consideration, and the historical documentation of what actions proved effective in addressing the persistence in such historical initiatives.

In some embodiments, a set of 'best practices' is automatically assembled for each performance-factor (risk) in the (ranked) list of co-emergent performance-factors (risks), using historical data on initiatives that experienced similar co-emergence for the performance-factor (risk) under consideration, and the historical documentation of what actions proved effective in addressing the co-emergence in such historical initiatives.

Mitigation actions that are triggered automatically may include initiating marketing, triggering resources replenishment, triggering reminders to take corrective actions, triggering a process for starting training, automatically loading and starting an antivirus program or patch, and other alerts for making appropriate decisions and initiatives.

As an example, an action that is automatically triggered may include automatically or autonomously executing on a processor or device, a training application or software and opening a user interface of the training application on a device associated with a user, for the user to be trained in the area related to one or more of the performance-factors under consideration.

As another example, an action that is automatically triggered may include sending a signal to an automated warehousing system that stocks inventory, and driving the automated warehousing system to autonomously replenish or relocate resources or items.

Another example of an action may be related to antivirus system ranking. For instance, an anti-virus patch may be automatically loaded and run.

Based on prioritized persistent (or likely to occur) risks and/or opportunities, the microcontroller in some embodiments may trigger automatic operational actions to mitigate risks and seize opportunities.

FIG. 1 is a diagram illustrating components of a system in one embodiment. A microcontroller 102 may include one or more hardware processors and receive data from a data storage 104 or database system storing sensory data streams 106 received from a plurality of sensors coupled to physical devices, e.g., via a network 110. The data storage 104 also stores manual data stream 108. The sensory data stream refers to automatically measured signals that are due to sensors, e.g., by sensors automatically or autonomously. The manual stream refers to the signal that is provided, e.g., by a user.

The microcontroller 102 performs the analysis of the data received from the data storage 104, and generates a signal or alert. An alarm/alert component 112 receives the signal and an automatic trigger component 114 automatically triggers a response 116, for example, an action. The alarm/alert component 112 also may perform a manual trigger 118. In some embodiments, data is sensed and obtained via two means: Sensory stream via automated sensors, as well as manual stream via human-input or user-input. The microcontroller 102 produces a model-based alarm/alert, which in turn may also result in two types of triggers for further control action, automated triggers that are automatic responses triggered by automated actuators due to the microcontroller 102 output or the data, and user triggers that user-input responses trigger by a user in the loop. Both types of triggers may result in system-wide-responses. Liquid crystal display (LCD) or another display 120 may visualize the triggers and responses, in one aspect.

Figure 2:
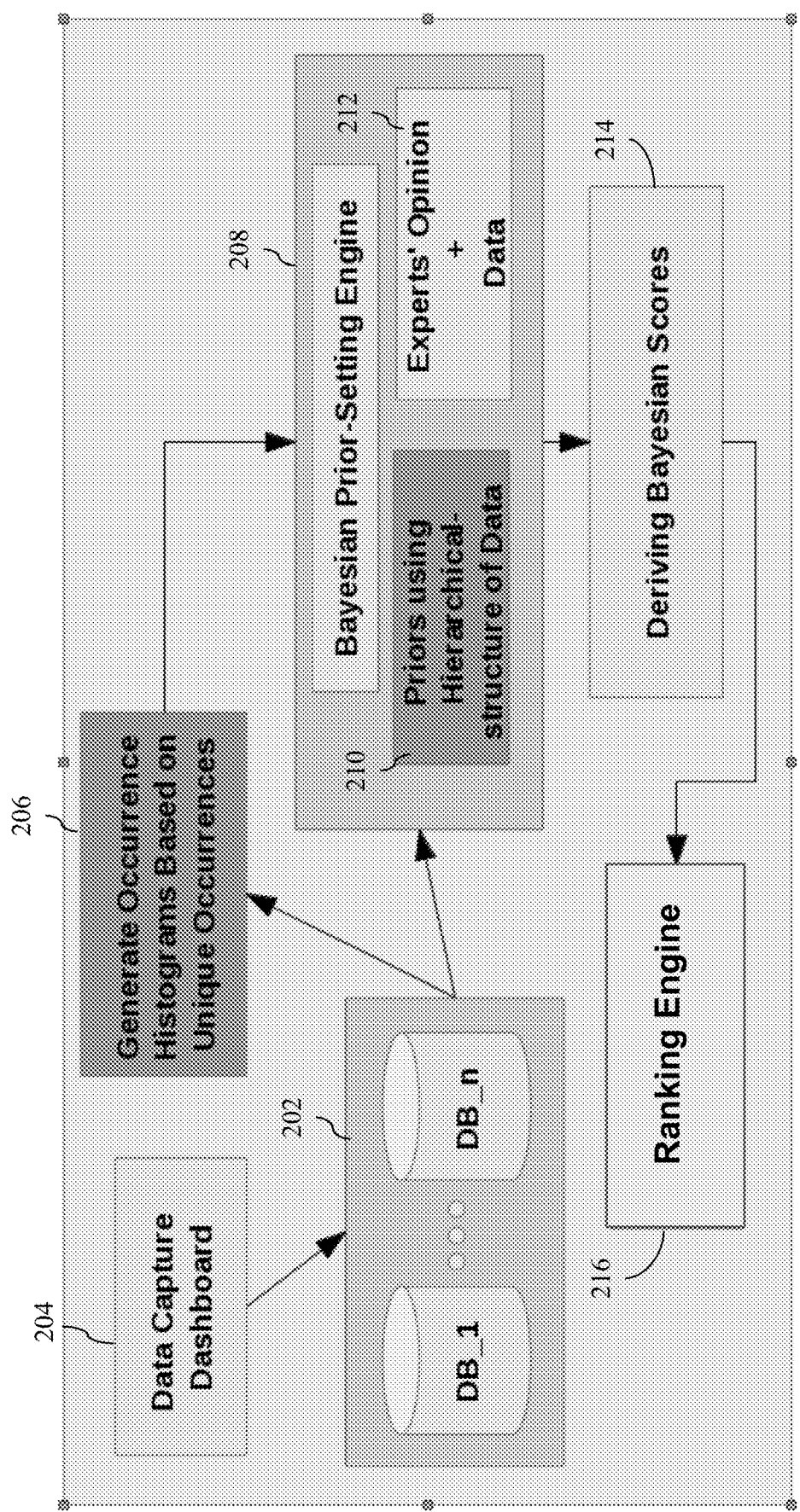
FIG. 2 is a diagram illustrating microcontroller components of a system in one embodiment.

FIG. 2 is a diagram illustrating microcontroller components of a system in one embodiment. In some embodiment, the microcontroller may be implemented based on a ranking engine. In some embodiments, a ranking engine 216 is a program, an algorithm that computes a Bayesian persistence score and ranks the items (risks) using that score. Database systems may store data in storage devices 202. The microcontroller may capture the data stored in the storage devices 202 on a dashboard or another user interface 204. The microcontroller may also generate occurrence histograms based on unique occurrences detected from the data, for example, as shown at 206. For instance, historical data is summarized in frequency histograms.

A Bayesian prior-setting engine component 208 of the microcontroller may build a hierarchical structure of data 210 from the data 202, and also combine experts' opinion and data 212. In some embodiments, the Bayesian prior-setting engine component 208 establishes the prior distribution for the frequency distribution of the number of recurrent observations for any chosen risk (or per mapping, the histogram-based frequency distribution across the ratings 1, . . . , 5 (or in general 1, . . . , N) for any chosen "item/product"). Such a prior may be arrived at using the empirical data across projects (or "users" as projects are mapped to users). Furthermore, it may be done at higher levels in the hierarchy corresponding to the risk under question. This is to boost the empirical signal to a higher level in the hierarchy. In some embodiments, it may also be provided as an input, e.g., a Bayesian Prior input by a user.

The hierarchy or hierarchy structure is a tree-based taxonomy. Observations at a lower level in the hierarchy are also treatable as observations at a higher level in the taxonomy. For example, consider the linear chain hierarchical set of risks at three levels: "Sales Risk (level 1)→Sales Risk Due to X (level 2)→Sales Risk due to X and specifically due to Y (level 3). There may be only 2 projects that have observed this risk at the finest level (e.g., level 3 above). But may be several projects, e.g., 20 that observed this risk at level 2. The system and/or method may boost the signal by analyzing the empirical data at level 3, and using the analysis at level 2 to compute a Prior distribution and use it at the lower level 3. In general, the above may be done for a hierarchical tree.

In some embodiments, priors can be set using a data-driven approach. For example, a neutral prior can be derived using portfolio-wide averages. As another example, a project-signature sensitive prior can be derived using a subset of projects. Priors may also be derived from expert opinions. For example, experts may know that certain risks and/or opportunities may arise or persist due to an external factor or due to an inside information that may not be present in the data. Priors may be with data, expert opinion, or a combination of both.

A component at 214 derives Bayesian scores based on the output of the Bayesian prior-setting engine 208. A ranking engine 216 ranks the derived scores.

For instance, the components at 212 and 214 summarize the histograms into a single score that can be efficiently and reliably used to compare performance factors and rank them in order, for example, by the component at 216.

In one aspect, the microcontroller may provide project management decision tool that predicts risks and/or opportunities that will persist (if already observed) and those that may potentially occur. Relying on data hierarchical structure, the microcontroller is able to enrich priors, and address data uncertainty and limited availability of data. By addressing data uncertainty and lack of prior experience and/or knowledge, the microcontroller enables the management of new types of projects.

Figure 3:
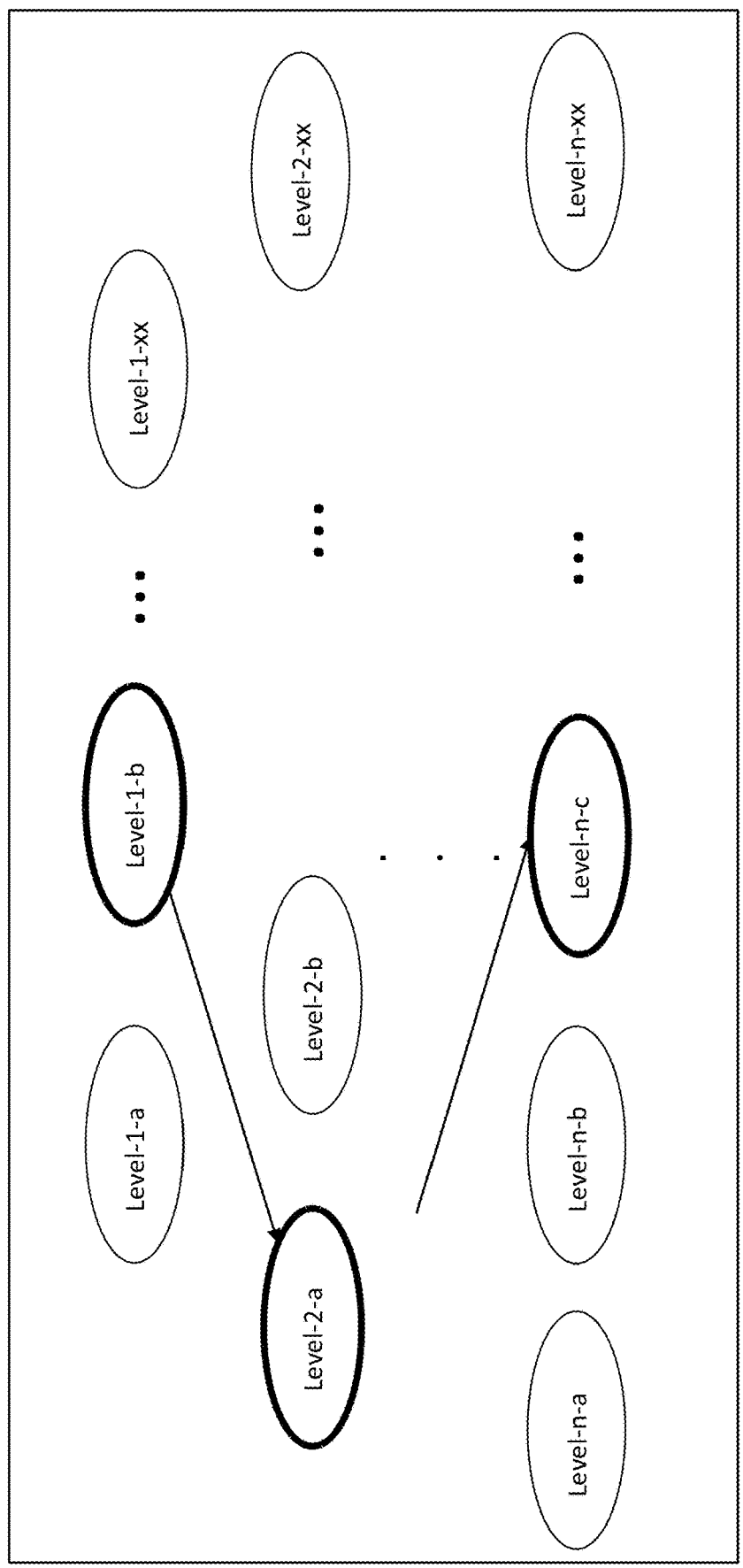
FIG. 3 illustrates an example of data structure in one embodiment.

FIG. 3 illustrates an example of data structure in one embodiment. The data structure represents risks and/or opportunities in hierarchical structure, and may be reported and described at different levels of granularity. For instance, the root nodes have higher risks/opportunity levels that the leaf nodes: e.g., Risk-1: =Level-1-b>Level-2-a> . . . >Level-n-c. This figure shows risks that are described in progressively finer and finer detail.

Figure 4:
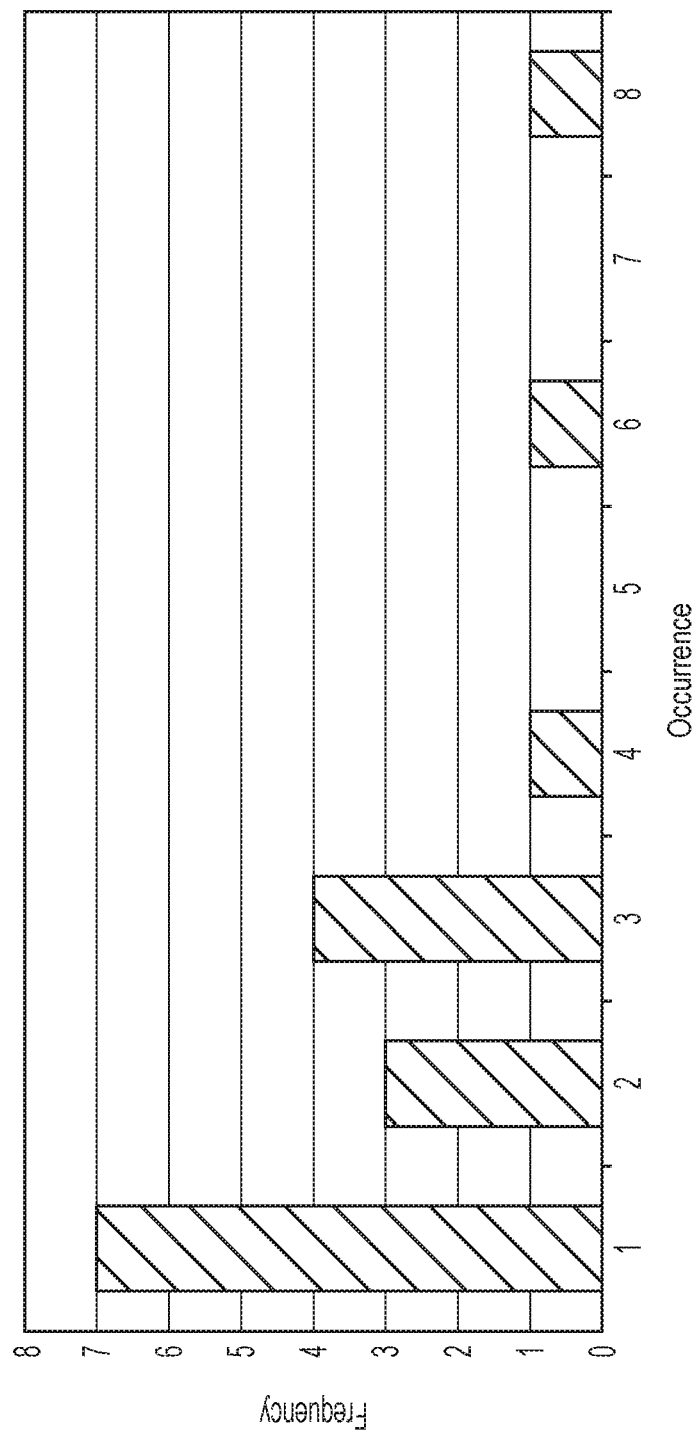
FIG. 4 is a diagram showing a sample histogram in one embodiment.

FIG. 4 is a diagram showing a sample histogram in one embodiment, for instance, shown in FIG. 2 at 206. The microcontroller may capture persistence using occurrence frequency histograms, a sample of which is shown in FIG. 4. For instance, for each risk and/or opportunity, an occurrence frequency histogram is obtained. Occurrence, across the tracking-lifetime of a project, e.g. 12 quarters (each quarter represents a 3 months span), is the number of quarters in which a risk has been uniquely observed. Frequency is the number of projects in which a risk has occurred in a given number of quarters or has had a given occurrence.

Risks and/or opportunities are compared to identify most persistent or most likely to emerge risk and/or opportunity. In order to compare risks and/or opportunities using their histograms, the microcontroller develops a scoring (or ranking) system. A scoring system compiles and summarizes histograms into a single score that can be used for comparison. In one aspect, how the score is calculated determines the ranking. In addition to considering histograms, the microcontroller also considers other criteria.

The microcontroller in some embodiments uses Bayesian statistics to model prior beliefs on the persistence of risks and/or opportunities. With a Bayesian approach, smoothing may be performed in cases in which there is limited availability of data, for example, smooth a jumpy average towards the priors which are steady. As more observations are obtained, the Bayesian average moves toward the "true" average, for instance, data overrides priors.

Referring to FIG. 2, in one embodiment, the Bayesian average based on a Gaussian prior may derive the Bayesian scores at 214. In addition to actual number of projects, n, that observe a risk a given number of times, the microcontroller may add more projects, m, "pseudo projects," assuming that those additional projects observed average global persistence of 'mu', the mean of the Gaussian unit variance prior. This will push the average toward mu by m "pseudo" observations. The prior belief is that risks with small number of observations are ranked as average. In some embodiment, 'mu' ($\mu$) can be chosen, for example, as the average persistence across all risks. This way, risks with low number of occurrences will be ranked in the middle around 'mu', and not at the bottom of the list. The number of "pseudo" projects, m, is a hyperparameter of the conjugate prior distribution reflecting its precision. Small m decreases the effect of the prior. The microcontroller may tune m to control how quickly the score moves away from the global average 'mu'.

Since the posterior distribution of a Gaussian prior is also Gaussian, there is $$\frac{m\mu_0 + \rho \sum_{i=1}^{n} x_i}{m + \rho n}$$

where $\rho$ is the precision of the frequency distribution which the microcontroller can assume to be 1. In some embodiments, it may be assumed that the frequency distribution of occurrences of risk follow a Gaussian distribution. In the above equation, x is the number of times that a particular risk occurs in project i.

In another embodiment, the Bayesian average based on a Dirichlet prior may derive the Bayesian scores at 214 in FIG. 2. In this embodiment, the microcontroller may implement a multinomial model. Multinomial distributions allow representing the complete frequency histogram for the different possible occurrence per deal of risks (e.g., 1-12 quarters). Multinomial models provide a relative proportion which may be desirable when looking for a sort, e.g., sorting and rank-ordering a set of risks. The microcontroller may use the conjugate prior of the multinomial distribution, the Dirichlet distribution, which provides a probability distribution over all possible occurrences of a risk per project (e.g., 1-12 quarters). When combining Dirichlet with Multinomial distributions, using Bayes' Rule, a Dirichlet can be obtained and the two frequency histograms (the prior distribution for frequency as a histogram, and the empirically observed data driven histogram) can be combined. Prior, combined with Data gives a Posterior, as per Bayesian computation.

Dirichlet prior also has a smoothing effect. The Dirichlet prior can be set to represent a belief on the frequency histogram of the occurrence of a given risk or subset of risks, e.g., D (25, 18, 10, 10, 11, 3, 0, 1). The posterior distribution, also a Dirichlet, can be transformed into a single score using, for example, the expected value of the function representing the score of a particular histogram. If only linear scoring functions are assumed, then given the posterior D ($y_1, \ldots, y_n$), the expected value of the frequency $z_i$ for a particular occurrence (e.g., 4 quarters per project) is:

$$E[z_i] = \frac{y_i}{\sum_{k=1}^{n} y_k}$$

and through the linearity of expectation, $$\text{score} = \sum_{i=1}^{n} i \cdot E[z_i] = \frac{1}{\sum_{k=1}^{n} y_k} \sum_{i=1}^{n} i \cdot y_i$$

The following describes setting a hierarchical Bayesian prior in one embodiment. An organization's project portfolio is dynamic and changes in time. New types of projects may be introduced, along with their own new risks and opportunities, for example, at different levels of granularity, for example, as shown in FIG. 3. New risks and/or opportunities may not have sufficient data to predict their persistence, future emergence or to set a data-driven prior. For a given set of risks and/or opportunities, for instance, defined at a given level of granularity, a hierarchical structure is utilized in obtaining Bayesian priors for the set by considering these risks and/or opportunities at a higher level of granularity.

The prior obtained using the hierarchical structure of the data is referred to as a "Hierarchical Prior." This approach is particularly useful when sufficient data is not available. For example, two risks; Risk-1 and Risk-2, are different when described at Level-4, however, they may be the same risk when described at Level-3. For example, the two risks may share the same tree structure up to level-3 and only diverge at level-4 description. Such representation enriches the data set used for setting priors used for risks that share the same higher level description. For example, if there are 10 observations for Risk-1 and 7 observations for Risk-2, when considering them at a higher level, e.g., Level-3, they may become the same risk. Then the total observations would add to 17 instead for that risk considered at Level-3.

Referring to FIG. 2, the ranking engine 216 may perform a multi-criteria weighted ranking in some embodiments. For instance, the ranking engine 216 may use multiple criteria to rank risks for both persistence and emergence analysis. For example, to obtain top emerging risks, the ranking engine 216 may look at current co-occurrence, projects and quarters portfolio occurrence, project-signature sensitive Bayesian score, likelihood, and net-negative revenue impact. The ranking engine 216 then may use a weighted rank approach. For instance, for each risk, the ranking engine 216 may obtain the convex combination of the different criteria using weights assigned by experts' knowledge and preferences.

Table 1 shows example weighted ranking in one embodiment.

| Current Co-occurrence | Rank | Projects portfolio occurrence | Rank | Quarter portfolio occurrence | Rank | Signature sensitive score | Rank | Weighted rank |
|---|---|---|---|---|---|---|---|---|
| 5 | 38 | 50 | 38 | 133 | 38 | 2.5676 | 38 | 38 |
| 4 | 36.5 | 43 | 37 | 105 | 37 | 2.365 | 37 | 36.875 |

| Current Co-occurrence | Rank | Projects portfolio occurrence | Rank | Quarter portfolio occurrence | Rank | Signature sensitive score | Rank | Weighted rank |
|---|---|---|---|---|---|---|---|---|
| 3 | 32.5 | 23 | 35.5 | 48 | 36 | 2.0364 | 30 | 33.5 |
| 4 | 36.5 | 21 | 33.5 | 43 | 35 | 2.0027 | 27 | 33 |
| 3 | 32.5 | 23 | 35.5 | 41 | 34 | 1.7992 | 20 | 30.5 |
| 3 | 32.5 | 12 | 26.5 | 27 | 30 | 2.112 | 32 | 30.25 |

The Columns 1, 3, 5, 7 in Table 1 example are the various scores (such as the Bayesian persistence score, and in general any number of other scores, however, one may compute them), and columns 2, 4, 6, 8 are the corresponding score-induced ranks. The last column 9 is the weighted net rank. Table 1 shows that the multi-criteria based net ranking is derived from multiple individually based rankings FIG. 6 is a flow diagram illustrating a method in one embodiment. The method may be executed by at least one hardware processor. At 602, historical data associated with a set of projects is received. The historical data spans multiple consecutive time periods. At 604, a hierarchical data structure is generated that includes occurrences of performance factors in the historical data. At 606, based on the hierarchical data structure, Bayesian scores associated with the performance factors are generated. The Bayesian scores represent the likelihood of the performance factors occurring in a given project. At 608, the performance factors are ranked based on the Bayesian scores. At 610, based on the ranking, an alert and/or an action are automatically triggered.

Figure 5:
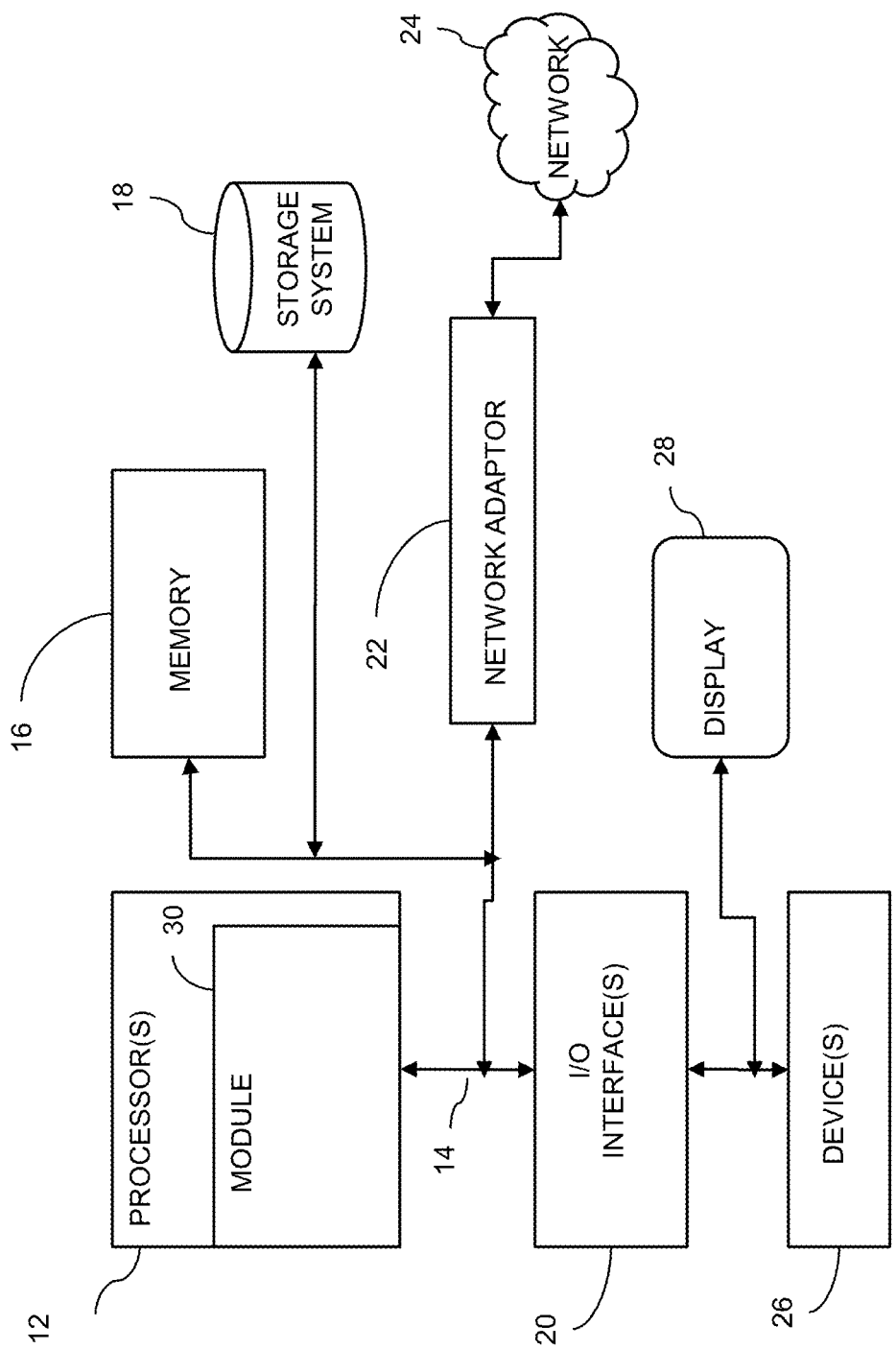
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of triggering a prioritized alert and provisioning an action, the method executed by at least one hardware processor, the method comprising:
    receiving historical data associated with a set of projects, the historical data spanning multiple consecutive time periods;
    generating a hierarchical data structure comprising occurrences of performance factors in the historical data;
    based on the hierarchical data structure, deriving Bayesian scores associated with the performance factors, the Bayesian scores representing likelihood of the performance factors occurring in a given project, the Bayesian scores derived using prior distribution for the frequency distribution of the number of recurrent observations associated with the performance factors, wherein the prior distribution is established at higher levels of the hierarchical data structure and further using an expert opinion;
    ranking the performance factors based on the Bayesian scores;
    based on the ranking, automatically triggering an alert and an action, the action mitigating future occurrence of a performance factor of the performance factors;
    wherein the hierarchical data structure includes a tree-based taxonomy, wherein observations at a lower level in a hierarchy are also treatable as observations at a higher level in the tree-based taxonomy,
    wherein the at least one hardware processor dynamically learns features governing generative process of the given project over time.

2. The method of claim 1, further comprising receiving expert knowledge associated with the occurrences of performance factors and combining the hierarchical data structure and the expert knowledge, wherein the deriving uses the combined hierarchical data structure and expert knowledge in deriving the Bayesian scores.

3. The method of claim 1, wherein the deriving comprises modeling a Bayesian average based on a Gaussian prior model.

4. The method of claim 1, wherein the deriving comprises modeling a Bayesian average based on a Dirichlet prior.

5. The method of claim 1, wherein the Bayesian scores represent likelihood of the performance factors persisting in the given project and likelihood of the performance factors emerging in the given project.

6. The method of claim 5, wherein the ranking comprises weighted ranking considering the likelihood of the performance factors persisting in the given project and the likelihood of the performance factors emerging in the given project.

7. The method of claim 1, wherein the action comprises automatically starting an application on a user device.

8. A computer readable storage medium storing a program of instructions executable by a machine to perform a method of triggering a prioritized alert and provisioning an action, the method executed by at least one hardware processor, the method comprising:
    receiving historical data associated with a set of projects, the historical data spanning multiple consecutive time periods;
    generating a hierarchical data structure comprising occurrences of performance factors in the historical data;
    based on the hierarchical data structure, deriving Bayesian scores associated with the performance factors, the Bayesian scores representing likelihood of the performance factors occurring in a given project, the Bayesian scores derived using prior distribution for the frequency distribution of the number of recurrent observations associated with the performance factors, wherein the prior distribution is established at higher levels of the hierarchical data structure and further using an expert opinion;
    ranking the performance factors based on the Bayesian scores;
    based on the ranking, automatically triggering an alert and an action, the action mitigating future occurrence of a performance factor of the performance factors;
    wherein the hierarchical data structure includes a tree-based taxonomy, wherein observations at a lower level in a hierarchy are also treatable as observations at a higher level in the tree-based taxonomy,
    wherein the at least one hardware processor dynamically learns features governing generative process of the given project over time.

9. The computer readable storage medium of claim 8, further comprising receiving expert knowledge associated with the occurrences of performance factors and combining the hierarchical data structure and the expert knowledge, wherein the deriving uses the combined hierarchical data structure and expert knowledge in deriving the Bayesian scores.

10. The computer readable storage medium of claim 8, wherein the deriving comprises modeling a Bayesian average based on a Gaussian prior model.

11. The computer readable storage medium of claim 8, wherein the deriving comprises modeling a Bayesian average based on a Dirichlet prior.

12. The computer readable storage medium of claim 8, wherein the Bayesian scores represent likelihood of the performance factors persisting in the given project and likelihood of the performance factors emerging in the given project.

13. The computer readable storage medium of claim 12, wherein the ranking comprises weighted ranking considering the likelihood of the performance factors persisting in the given project and the likelihood of the performance factors emerging in the given project.

14. The computer readable storage medium of claim 8, wherein the action comprises automatically starting an application on a user device.

15. A system of triggering a prioritized alert and provisioning action, comprising:

a hardware processor operable to receive historical data associated with a set of projects, the historical data spanning multiple consecutive time periods;

the hardware process further operable to generate a hierarchical data structure comprising occurrences of performance factors in the historical data;

based on the hierarchical data structure, the hardware processor further operable to derive Bayesian scores associated with the performance factors, the Bayesian scores representing likelihood of the performance factors occurring in a given project, the Bayesian scores derived using prior distribution for the frequency distribution of the number of recurrent observations associated with the performance factors, wherein the prior distribution is established at higher levels of the hierarchical data structure and further using an expert opinion;

the hardware processor further operable to rank the performance factors based on the Bayesian scores;

based on the ranking, the hardware processor further operable to automatically trigger an alert and an action, the action mitigating future occurrence of a performance factor of the performance factors;

wherein the hierarchical data structure includes a tree-based taxonomy, wherein observations at a lower level in a hierarchy are also treatable as observations at a higher level in the tree-based taxonomy, wherein the hardware processor dynamically learns features governing generative process of the given project over time.

16. The system of claim 15, wherein the action comprises automatically starting an application on a user device.

17. The system of claim 15, wherein the hardware processor further receives expert knowledge associated with the occurrences of performance factors and combine the hierarchical data structure and the expert knowledge, wherein the hardware processor derives the Bayesian scores using the combined hierarchical data structure and expert knowledge.

18. The system of claim 15, wherein the hardware processor models a Bayesian average based on a Gaussian prior model for deriving the Bayesian scores.

19. The system of claim 15, wherein the hardware processor models a Bayesian average based on a Dirichlet prior for deriving the Bayesian scores.

20. The system of claim 15, wherein the Bayesian scores represent likelihood of the performance factors persisting in the given project and likelihood of the performance factors emerging in the given project, wherein the hardware processor ranks the performance factors by weighted ranking considering the likelihood of the performance factors persisting in the given project and the likelihood of the performance factors emerging in the given project.

* * * * *